(12) United States Patent
Wilson

(10) Patent No.: US 6,580,363 B1
(45) Date of Patent: Jun. 17, 2003

(54) METHOD OF ENCAPSULATING AN ELECTRONIC TIRE TAG

(75) Inventor: Paul B. Wilson, Murfreeboro, TN (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/608,426

(22) Filed: Jun. 30, 2000

(51) Int. Cl.[7] ............................................. B60C 23/00
(52) U.S. Cl. ..................... 340/445; 340/442; 340/447; 73/146.2; 73/146.4; 73/146.5
(58) Field of Search ................. 340/445, 447, 340/442, 572.1, 573.1; 73/146.2, 146.4, 146.5

(56) References Cited

U.S. PATENT DOCUMENTS

| 3,723,966 | A | | 3/1973 | Mueller et al. ............... 340/58 |
|---|---|---|---|---|
| 3,787,806 | A | | 1/1974 | Church ......................... 340/58 |
| 4,067,235 | A | | 1/1978 | Markland et al. .......... 73/146.5 |
| 5,223,851 | A | | 6/1993 | Hadden et al. .............. 343/873 |
| 5,472,032 | A | | 12/1995 | Winston et al. ............. 152/415 |
| 5,500,065 | A | | 3/1996 | Koch et al. .................. 156/123 |
| 5,562,787 | A | * | 10/1996 | Koch et al. .................. 340/442 |
| 5,573,610 | A | | 11/1996 | Koch et al. ............... 152/152.1 |
| 5,573,611 | A | | 11/1996 | Koch et al. ............... 152/152.1 |
| 5,731,754 | A | | 3/1998 | Lee, Jr. et al. .............. 340/447 |
| 6,030,478 | A | * | 2/2000 | Koch et al. .................. 156/123 |

FOREIGN PATENT DOCUMENTS

WO    WO 96/28311    9/1996

* cited by examiner

Primary Examiner—Daniel J. Wu
Assistant Examiner—Hung Nguyen
(74) Attorney, Agent, or Firm—Michael Huber; Fred Zollinger

(57) ABSTRACT

A tire tag includes a monitoring package, a battery, and an antenna encapsulated within an encapsulation mold. The antenna is connected to the encapsulation mold so that the antenna does not move during the encapsulation process. The antenna remains spaced apart from the monitoring package but connected to the monitoring package by connectors that are completely surrounded by encapsulation material so that the connectors are protected during the operation of the tire tag. The antenna may be connected to the encapsulation mold by an adhesive, by pins, by an interference fit, or by clips. The connection between the antenna and the monitoring device may be made by soldered wires or by spring loaded connector pins. The method of encapsulating the tire tag in this manner allows the position of the antenna to be precisely known before, during, and after the encapsulation process.

28 Claims, 4 Drawing Sheets

METHOD OF ENCAPSULATING AN ELECTRONIC TIRE TAG

BACKGROUND OF THE INVENTION

1. Technical Field

The present invention generally relates to tire tag devices used in pneumatic tires to monitor conditions of the pneumatic tires. More particularly, the present invention relates to a method of encapsulating a tire tag wherein the antenna is separate and spaced from the monitoring package. Specifically, the present invention relates to a method of encapsulating an electronic tire tag wherein the position of the antenna is held in place during the encapsulation process so that the orientation of the antenna is known after the encapsulation process.

2. Background Information

Tire tags used to monitor engineering conditions of pneumatic tires are becoming increasingly desired in the tire art. Tire tags are being used to monitor temperature, pressure, and other engineering conditions inside pneumatic tires while the tires are in operation on vehicles. The most desirable type of tire tag transmits data out of the pneumatic tire with radio waves so that a direct external physical attachment between a reader and the tire is not needed to gather data.

Tire tags that transmit data out of the tire generally include a monitoring package that includes sensors, memory, a controller, a transmitter, and a receiver that are used to gather, store, receive, and transmit data and instructions. The tire tag also includes a power source such as a battery. These tire tags also include an antenna used to create the outgoing signals and receive the incoming signals.

Tire tag antennae have been located in a variety of positions with respect to the monitoring package in the prior art. Antennae have been connected directly to the circuit board, mounted on the tire rim, mounted in the tire, extending away from the monitoring package into the cavity of the tire, and mounted in a patch with connections to the monitoring package. One problem in the art is maintaining adequate connections between the monitoring package and the antenna. Maintaining the connections is difficult because a tire is not a stable mounting surface. The bending and flexing of the tire body stresses the connections between the antenna and the monitoring package. The art thus desires a mounting configuration for the antenna wherein the connections between the antenna and the monitoring package are protected from the flexing forces of the pneumatic tire.

The art has also recognized that the position of the antenna with respect to the tire can be critical for obtaining strong signals into and out of the pneumatic tire. The mounting configuration of the antenna thus must provide a predictable position for the antenna when the mounting of the antenna is complete. In other words, the process of mounting the antenna must result in a predictable antenna position with respect to the monitoring package so that the antenna may be correctly mounted in the pneumatic tire for strong transmission signals.

SUMMARY OF THE INVENTION

In view of the foregoing, the present invention provides a method for encapsulating a tire tag wherein the antenna and monitoring package are encapsulated together so that the connection between the antenna and the monitoring package is captured within a rigid encapsulation material that prevents the connection between the antenna and the monitoring package from breaking when the tire tag is used in a dynamic pneumatic tire environment.

The invention provides devices and configurations for holding the antenna in a fixed position with respect to the monitoring package or encapsulation mold so that the final position of the antenna may be readily determined after the encapsulation process is complete.

In general, the invention provides a method wherein the antenna is mounted to the encapsulation mold in a known position, the remaining elements of the monitoring package are assembled into the encapsulation mold, and the encapsulation material is added to the mold to encapsulate the elements of the tire tag and to fix the positions of the elements with respect to each other.

The invention also provides different types of connections between the antenna and the monitoring package that ensure a consistent, reliable connection between the antenna and the monitoring package.

In one embodiment of the invention, the antenna blades are directly connected to the monitoring package with wires that are soldered to each element. In another embodiment, spring-loaded connecting pins extend between the monitoring package and the blades to create a constant force between the antenna blades and the spring loaded connecting pins to ensure a reliable connection.

The invention also provides a variety of different locations for the antenna within, outside of, and embedded within the encapsulation mold. In addition, the invention provides a variety of arrangements to hold the antenna with respect to the encapsulation mold while the encapsulation mold is being filled with the encapsulation material.

BRIEF DESCRIPTION OF THE DRAWINGS

The preferred embodiments of the invention, illustrative of the best mode in which applicant contemplated applying the principles of the invention, are set forth in the following description and are shown in the drawings and are particularly and distinctly pointed out and set forth in the appended claims.

Similar numbers refer to similar parts throughout the specification.

DESCRIPTION OF THE PREFERRED EMBODIMENTS

Figure 1:
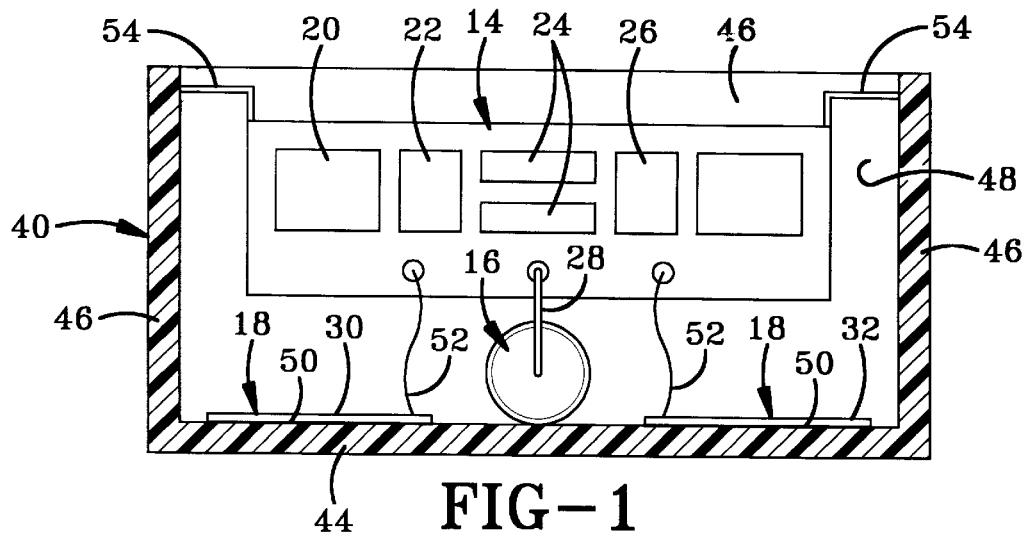
FIG. 1 is a sectional side view showing a first embodiment of the invention wherein the antenna is disposed on the bottom surface of the encapsulation mold and connected to the monitoring package with wires.
Figure 2:
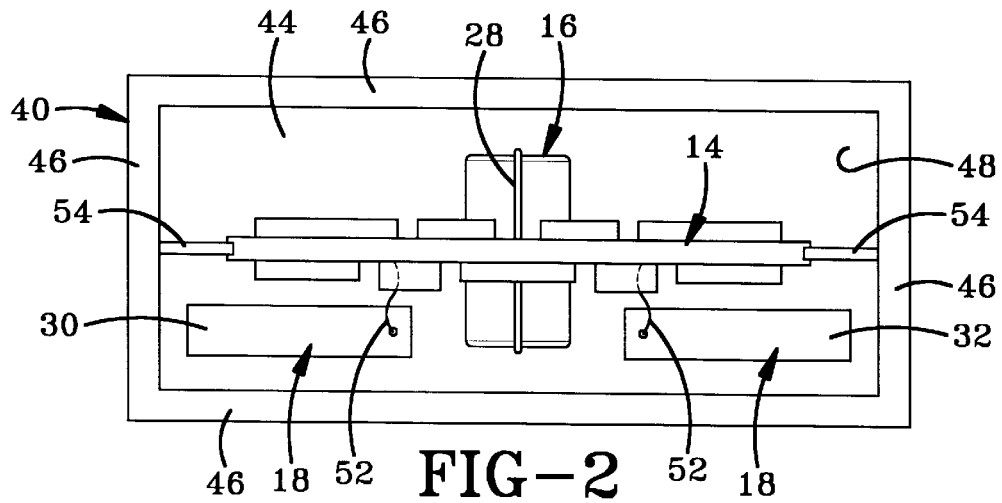
FIG. 2 is a top plan view of FIG. 1.
Figure 3:
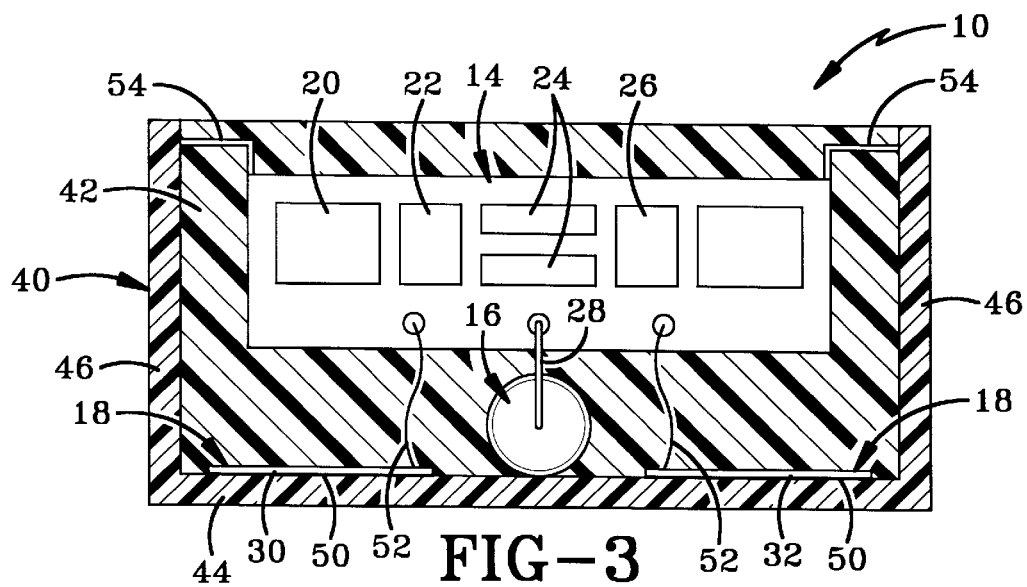
FIG. 3 is a view similar to FIG. 1 showing the tire tag after it has been encapsulated.
Figure 10:
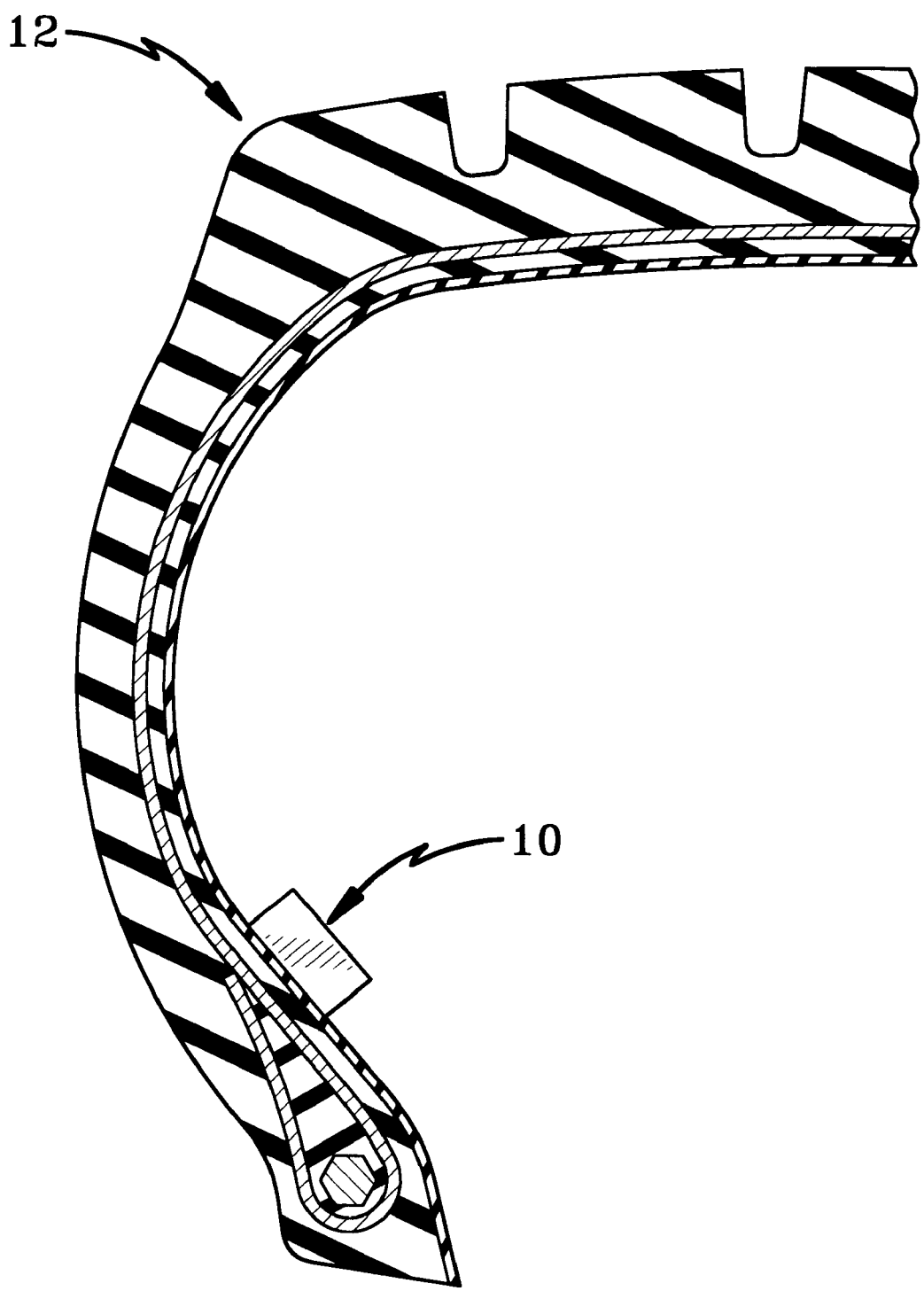
FIG. 10 is a sectional view of a pneumatic tire with the encapsulated tire tag connected to the inner surface of the tire.

The first embodiment of the encapsulated tire tag of the present invention is indicated generally by the numeral 10 in FIGS. 3 and 10. FIG. 10 depicts tire tag 10 mounted on the inner surface of a pneumatic tire 12. In general, tire tag 10 senses at least one engineering condition of pneumatic tire 12 and transmits signals outside of pneumatic tire 12 to a reader (not shown) that gathers the information so that the user of pneumatic tire 12 can make decisions about the maintenance of tire 12.

Tire tag 10 generally includes a monitoring package 14, a power source 16, and an antenna 18. Monitoring package 14 includes all of the elements required to sense conditions of tire 12, store the data, transmit, and receive transmissions from outside of tire 12. Monitoring package 14 may be provided in a variety of different configurations to perform these functions and the specific elements of monitoring package 14 do not change the scope of the present invention. For the purpose of providing an example, monitoring package 14 may include a central processing unit 20, a memory unit 22, a plurality of switches 24 and a transmitter/receiver 26. Power source 16 is preferably a battery that may be mounted directed on monitoring package 14 or may be connected to monitoring package 14 by suitable connectors 28 as shown in the drawings. The components of monitoring package 14 are typically mounted on a circuit board.

Antenna 18 may be any suitable type of antenna configured to work with monitoring package 14 to receive and transmit signals from tire 12. For instance, antenna 18 may be a single antenna element such as a rod, a strip, a wire, a coil, a plate, etc. Antenna 18 may also be a pair of elements as depicted in the drawings such as antenna plates 30 and 32. In accordance with the objectives of the present invention, monitoring package, power source, and antenna 18 are encapsulated in a manner that holds the relative position of antenna plates 30 and 32 with respect to monitoring package 14 and ensures that the connections between antenna 18 and monitoring package 14 are well protected from the dynamic environment of pneumatic tire 12.

In the first embodiment of the invention, tire tag 10 is encapsulated by placing monitoring package 14, power source 16, and antenna 18 within an encapsulation mold 40 and filling mold 40 with an encapsulation material 42. In the preferred embodiment of the present invention, encapsulation material 42 is a formulation including 100 gm STYCAST® 2651; 7 gm Catalyst 9; and 3 drops defoamer 88. In another embodiment of the invention, encapsulation material 42 is a formulation including 110 gm STYCAST® 2651; 10 gm Phenyl Gycidyl Ether; 9.4 gm Catalyst 9; and 6 drops of defoamer 88. These materials were mixed together at room temperature until thoroughly mixed. The formulation was degassed until foaming subsided. The formulation was then poured into the mold and allowed to cure in an oven at 55 degrees Celsius for thirty minutes. It was then post-cured at 80 degrees Celsius for thirty minutes.

Various other encapsulation materials 42 will also function with the present invention. For instance, a variety of epoxies and urethanes that are pourable and cure to a rigid tough material having a high modulus of elasticity may be used. It is desired that encapsulation material 42 having a Young's modulus of at least 30,000 psi and which is capable of being molded around the electronic monitoring package. Preferably, encapsulation material 42 will have a Young's modulus at least 100,000 psi.

STYCAST®2651 is the preferred encapsulation material. Alternatively, high melting point polyurethanes and/or polyureas may be utilized. The polyurethanes are derived from polyisocyanates which generally have the formula $R(NO)_n$ where n is an integer of 2, 3 or 4 with approximately 2 being preferred. The "n" may, however, vary and often is not an integer because combinations of various polyisocyanates can be utilized. R is an aliphatic having from about 2 to about 20 carbon atoms or preferably an aromatic including an alkyl substituted aromatic having from about 6 to about 20 carbon atoms with from about 6 to about 15 carbon atoms being desired, or combinations thereof. Examples of suitable polyisocyanates include 1,6-diisocyanto hexane; 2,2,4- and/or 2,4,4-trimethylhexamethylene diisocyanate; p- and m-tetramethyl xylene diisocyanate; dicyclohexylmethane-4, 4'-diisocyanate (Hydrogenated MDI); 4,4-methylene diphenyl isocyanate (MDI); p- and m-phenylene diisocyanate; 2,4- and/or 2,6-toluene diisocyanate (TDI); durene-1,4-diisocyanate; isophorone diisocyanate and isopropylene bis-(p-phenyl isocyanate). TDI is desirably utilized. The various diphenylmethane diisocyanates (MDI) and mixtures of MDI with polymeric MDI having an average isocyanate functionality of from about 2 to about 3.2 are preferred.

The preparation of the polyurethanes and/or polyureas are well known to the art and to the literature. For example, a short chain oligomer or polymer derived from polyester or polyether polyols generally having a molecular weight of from about 55 to about 1,000 and preferably from about 6 to about 200 are reacted with the above-noted diisocyanates to form a urethane prepolymer. Similarly, a short chain diamine can be utilized and reacted with the above-noted diisocyanates to form a urea prepolymer. Aromatic diisocyanates are generally utilized to yield high melting point urethane or urea prepolymers which also generally have a high modulus of elasticity. The resulting prepolymer is subsequently reacted with diols, diamine, diacids, or amino alcohols, and the like to cure the same and form a polyurethane or polyurea. Alternatively, the polyurethanes and/or polyureas are formed by reacting an existing prepolymer with the above-noted curing or chain extending agents.

The equivalent ratio of isocyanate groups (NCO) reacted with the hydroxyl groups (OH) or amine groups ($NH_2$) of the short chain compound is generally from about 0.90 to about 1.10, desirably from about 0.95 to about 1.05, and preferably from about 0.98 to about 1.02.

In general, thermoset epoxy resins are preferred. The epoxy resin or polymer is generally formed by the reaction of bisphenol A and epichlorohydrin. The preparation of epoxy resins is well known to the literature and to the art. Generally, epichlorohydrin is reacted with a variety of hydroxy, carboxy, or amino compounds to form monomers with two or more epoxied groups, and these monomers are then used in the reaction with bisphenol A. Examples of such compounds are the diglycidyl derivative of cyclohexane-1, 2-dicarboxylic acid, the triglycidyl derivates of p-aminophenol and cyanuric acid, and the polyglycidyl derivative of phenolic prepolymers. Epoxidized diolefins can also be employed. Various co-reactants can be utilized to cure epoxy resins either through the epoxied or hydroxyl groups. Polyamines such as primary or secondary amines are a common curing agent such as aliphatic amines having a total of from about 2 to about 18 carbon atoms and desirably from about 4 to about 8 carbon atoms. Suitable compounds include diethylene triamine, triethylene tetraamine, tetraethylene pentaamine, 4,4'-diaminodiphenylmethane, and polyaminoamides. A combination of diethylene triamine and tetraethylene pentaamine is often desired. Aromatic amines can also be utilized such as those having a total of from 6 to 20 carbon atoms such as meta or paraphenylene diamine and the like. Other curing agents including polythiols, dicyandiamide (cyanoguanidine), diisocyanates, and phenolic prepolymers. Curing of epoxy resins can also be achieved by ring opening polymerization of the epoxied groups using either Lewis acids or Lewis bases.

Encapsulation mold 40 includes a bottom wall 44 and a plurality of sidewalls 46 that form an encapsulation cavity 48 wherein monitoring package 14, power source 16, and antenna 18 are mounted in the first embodiment of the invention. Encapsulation mold 40 is preferably fabricated from a material that will not interfere with the operation of monitoring package 14, power source 16 or antenna 18. Such materials may include non-metallic materials such as plastic, paper, rubber, wood, molded epoxies or other composite materials such as fiberglass and the like, or certain types of metals that will not interfere with transmission signals. The encapsulation mold 40 is preferably fabricated from the material that has a thermal expansion characteristic similar to encapsulation material 42 and that bonds readily to encapsulation material 42.

In accordance with the objectives of the invention, the position of antenna plates 30 and 32 must be maintained during the encapsulation process so that the final position of antenna 18 can be determined after antenna 18 has been encapsulated. In the first embodiment of the invention, antenna plates 30 and 32 are connected to bottom wall 44 by a suitable adhesive 50. Adhesive 50 will not fail when subjected to the encapsulation process and will not interfere with the transmission or reception activities of antenna 18.

Antenna plates 30 and 32 are connected to monitoring package 14 by suitable connectors 52 that are preferably wires soldered to both monitoring package 14 and antenna plates 30 and 32. Power source 16 may be positioned between plates 30 and 32 as depicted in the drawings or may be positioned in a variety of other known positions. Monitoring package 14 is held within encapsulation cavity 48 by appropriate clips 54 or by any other known mechanisms. For instance, monitoring package 14 may be held in encapsulation cavity 48 by an interference fit or by resting on power source 16. After monitoring package 14, power source 16 and antenna 18 are positioned within encapsulation cavity 48, encapsulation material 42 is added to encapsulation cavity 48 until monitoring package 14, power source 16 and antenna 18 are entirely covered by encapsulation material 42. Encapsulation material 42 then cures to form tire tag 10. This process provides a rigid body to tire tag 10 that protects the connection between antenna 18 and monitoring package 14 while allowing the precise position of antenna plates 30 and 32 to be known and maintained throughout the encapsulation process. Tire tag 10 may then be mounted directly to tire 12 or may be mounted to a patch that mounts tire tag 10 to pneumatic tire 12. In another embodiment of the invention, wall 44 is removed or has openings that allow encapsulation material 42 to directly connect encapsulation mold 40 to an attachment patch (not shown) that will be used to connect tire tag 10 to tire 12. The method of encapsulating tire tag 10 directly onto an attachment patch is disclosed in U.S. patent application Ser. No. 09/539,856, filed Mar. 31, 2000, which is owned by the Assignee of the present application.

Figure 4:
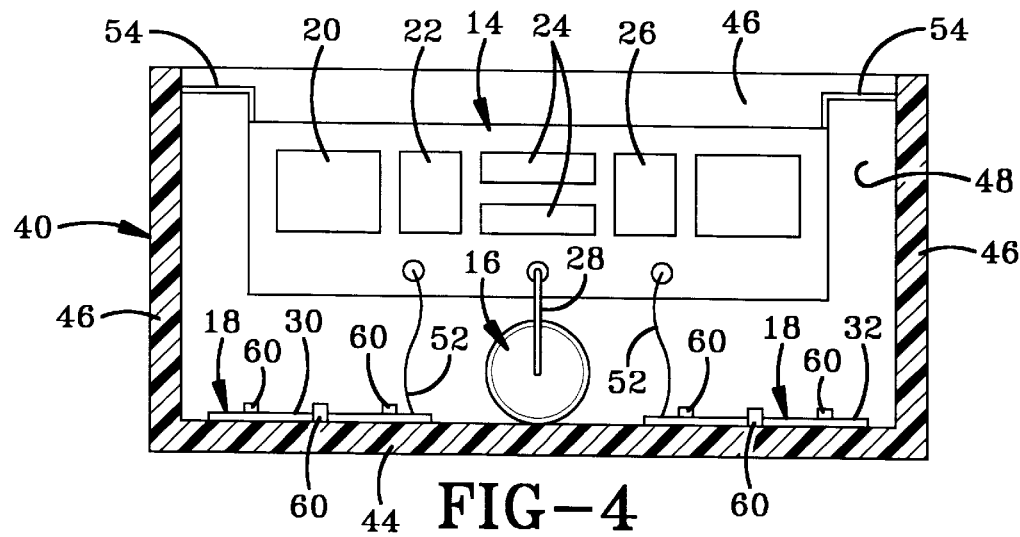
FIG. 4 is a view similar to FIG. 1 wherein the antenna is held on the bottom of the encapsulation mold with a plurality of pins.
Figure 5:
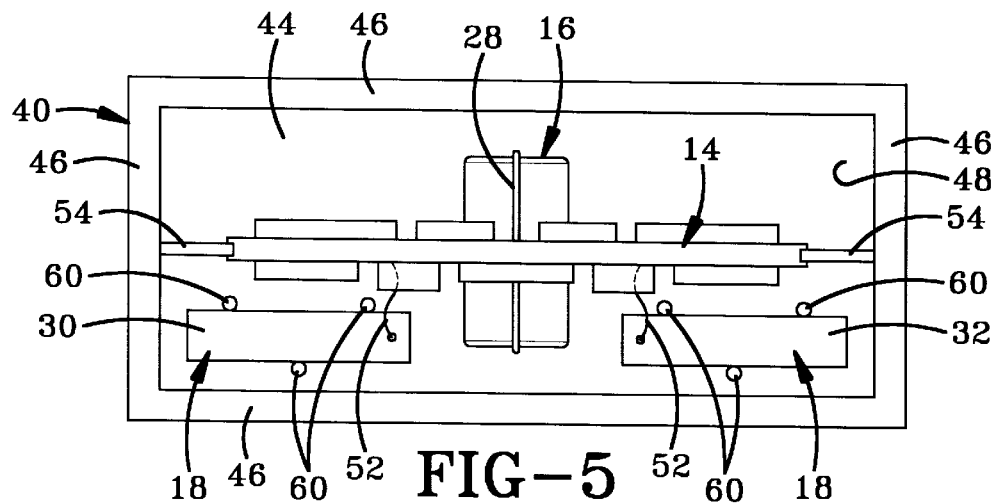
FIG. 5 is a plan view of FIG. 4.

A second embodiment of the invention is depicted in FIGS. 4 and 5. The second embodiment includes many of the same elements described above with respect to the first embodiment and the same numbers are used to refer to these elements.

In the second embodiment of the invention, antenna plates 30 and 32 are held against bottom wall 14 by a plurality of pins 60 that extend up from bottom wall 44. In the embodiment depicted in the drawings, three pins 60 are used to hold each antenna plate 30 and 32 in place during the encapsulation process. In other embodiments, different arrangements of pins 60 may be used. In still other embodiments, pins 60 may be combined with adhesive 50 to hold antenna 18 in place during the encapsulation process.

Figure 6:
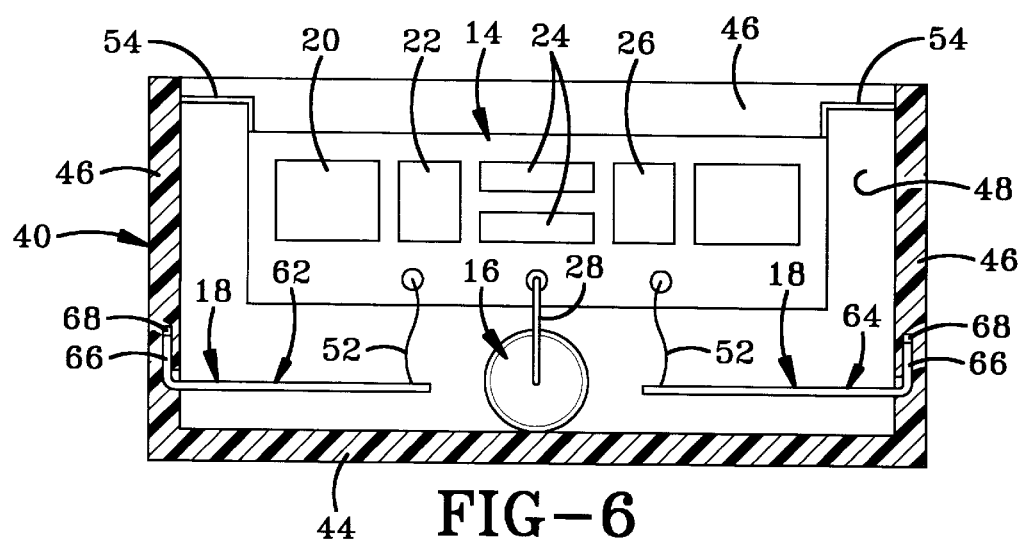
FIG. 6 is a view similar to FIG. 1 showing the antenna being held by the sidewalls of the encapsulation mold.

A third embodiment of the invention is depicted in FIG. 6. In the third embodiment, antenna 18 includes antenna blades 62 and 64. Antenna blades 62 and 64 each include a hook portion 66 that slides into a slot 68 formed in a sidewall 46 of encapsulation mold 40. The connection between hook 66 and slot 68 holds antenna blades 62 and 64 above bottom wall 44 so that encapsulation material 42 may completely surround blades 62 and 64 during the encapsulation process.

Figure 7:
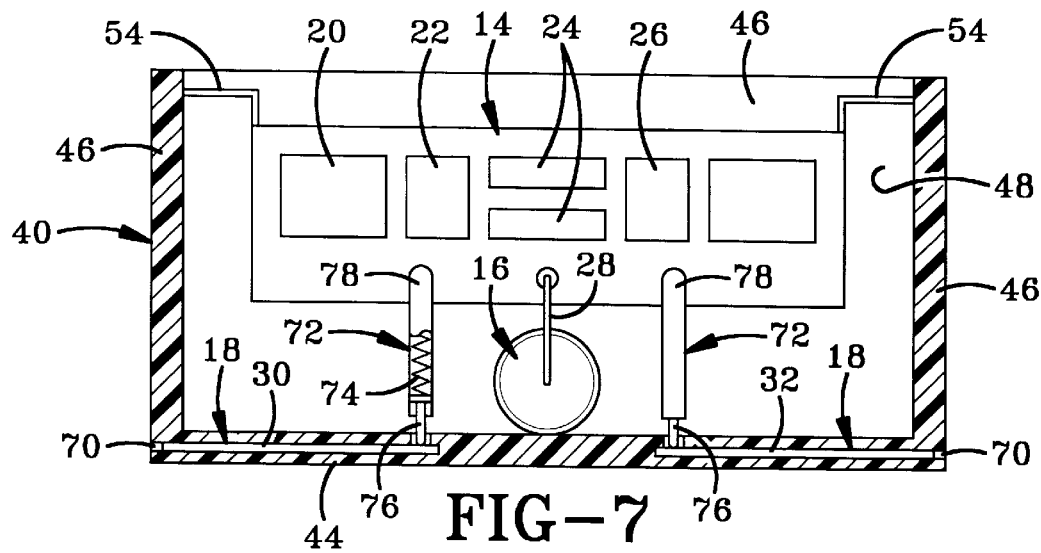
FIG. 7 is a view similar to FIG. 1 wherein the antenna is embedded within the bottom wall of the encapsulation mold and spring loaded connecting pins are used to form the connection between the monitoring package and the antenna.

The fourth embodiment of the invention is depicted in FIG. 7. In the fourth embodiment, bottom wall 44 includes slots 70 that receive antenna plates 30 and 32 and a frictional engagement to prevent antenna plates 30 and 32 from moving with respect to encapsulation mold 40. Adhesive 50 may also be used to lock antenna plates 30 and 32 within slots 70.

In the fourth embodiment, monitoring package 14 is connected to antenna 18 by spring loaded connector pins 72. Each spring loaded connector pin 72 includes a spring 74 that constantly forces a first connector element 76 against antenna 18. First connector element 76 slides with respect to a second connector element 78 but remains in constant electrical contact with second connector element 78. Second connector element 78 is connected to monitoring package 14. Spring 74 constantly pushes first connector element 76 against antenna 18 to ensure a solid, reliable connection while the tire tag is encapsulated with encapsulation material 42. Spring 74 may be a coil spring, a leaf spring, or any of a variety of other springs known in the art for creating a force between monitoring package 14 and antenna 18.

Figure 8:
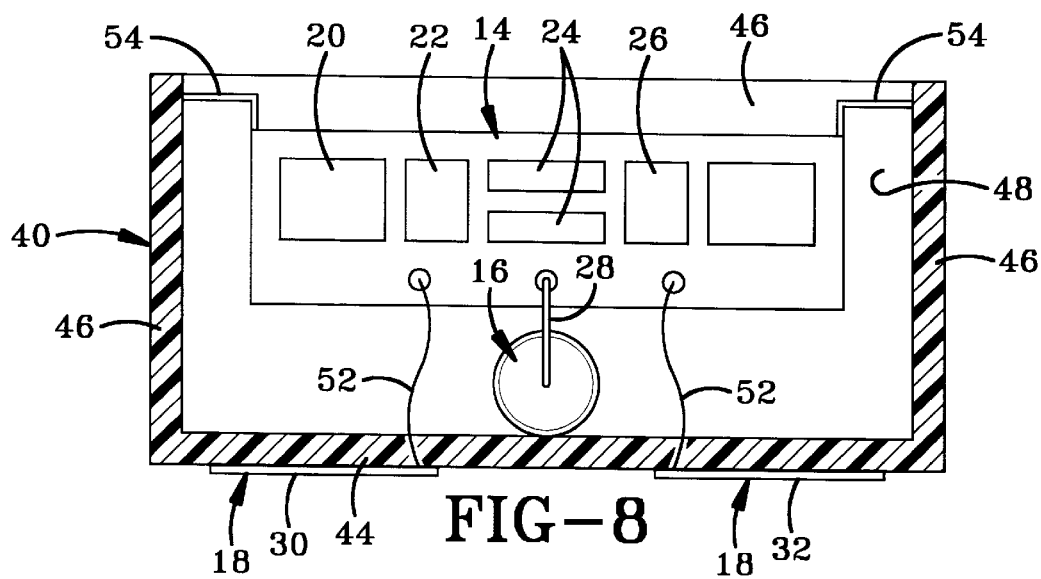
FIG. 8 is a view similar to FIG. 1 showing an embodiment with the antenna connected to the outside of the encapsulation mold.

The fifth embodiment of the invention is depicted in FIG. 8. In the fifth embodiment of the invention, antenna 18 is connected to the bottom of bottom wall 44 and may be held to the bottom surface by an appropriate adhesive. Connectors 52 extend through wall 44 to connect antenna 18 to monitoring package 14.

Figure 9:
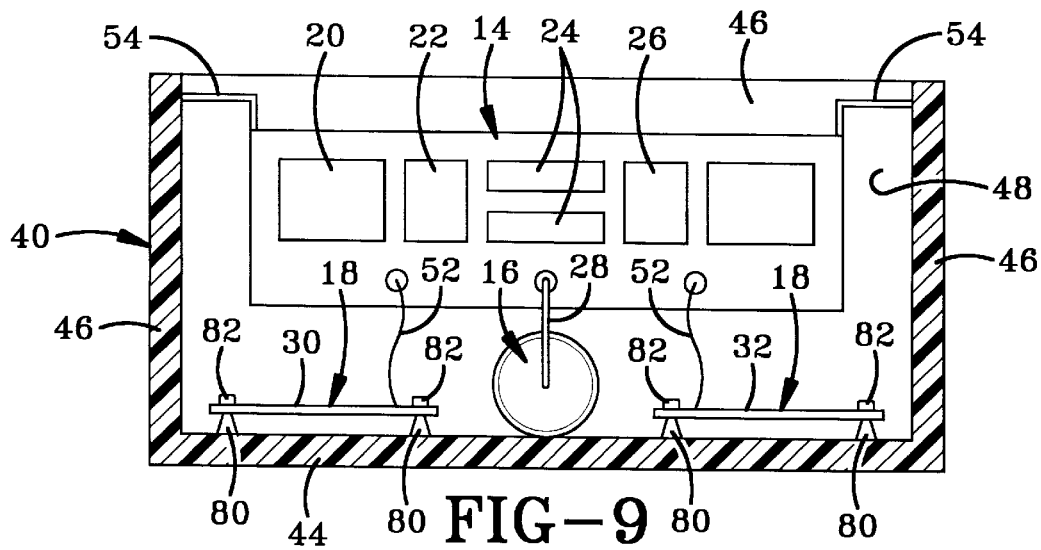
FIG. 9 is a view similar to FIG. 1 showing the antenna held in position above the bottom surface of the encapsulation mold.

The sixth embodiment of the invention is depicted in FIG. 9 wherein antenna plates 30 and 32 are supported by supports 80 above the upper surface of bottom wall 44 so that encapsulation material 42 may completely surround plates 30 and 32. Clips 82 are used to prevent plates 30 and 32 from moving during the encapsulation process.

In view of the foregoing, the present invention provides a tire tag that includes an antenna mounted separate and apart from the monitoring package wherein the antenna is positively held during the encapsulation process so that its position remains fixed during the encapsulation process and so that the position of the antenna may be determined after the antenna is encapsulated. The invention also provides a method of protecting the connection between the antenna and the monitoring package so that the dynamic environment of tire 12 does not damage or loosen the connections.

Accordingly, the improved method of encapsulating a tire tag apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the method of encapsulating a tire tag is constructed and used, the characteristics of the construction, and the advantageous new and useful results obtained; the new and useful structures, devices, elements, arrangements, parts, and combinations are set forth in the appended claims.

What is claimed is:

1. A tire tag for a pneumatic tire, the tire tag adapted to sense at least one engineering of the pneumatic tire; the tire tag comprising:
   a body;
   a monitoring package connected to the body;
   a plate antenna connected to the body;
   the antenna being spaced from the monitoring package;
   the body including an encapsulation material; and
   the body including an encapsulation mold.

2. The tag of claim 1, wherein the antenna is disposed adjacent the encapsulation mold.

3. The tag of claim 2, wherein the encapsulation mold includes a bottom wall; the antenna disposed adjacent the bottom wall of the encapsulation mold.

4. The tag of claim 3, wherein the antenna is connected to the bottom wall of the encapsulation mold by an adhesive.

5. The tag of claim 4, wherein the bottom wall has an inner surface and an outer surface.

6. The tag of claim 5, wherein the antenna is disposed adjacent the inner surface of the bottom wall.

7. The tag of claim 5, wherein the antenna is disposed adjacent the outer surface of the bottom wall.

8. The tag of claim 3, wherein the bottom wall includes a plurality of pins; the antenna being disposed between the pins.

9. The tag of claim 3, further comprising at least one clip; the antenna being held in position by the clip.

10. The tag of claim 1, wherein the encapsulation mold includes walls; at least a portion of the antenna being disposed within a wall of the encapsulation mold.

11. The tag of claim 10, wherein a major portion of the antenna is disposed within one of the walls of the encapsulation mold.

12. The tag of claim 10, wherein a portion of the antenna is cantilevered from one of the walls of the encapsulation mold.

13. A method of fabricating a tire tag for a pneumatic tire, the tire tag adapted to sense at least one engineering of the pneumatic tire; the method comprising the steps of:
   (a) providing a monitoring package;
   (b) providing a plate antenna;
   (c) encapsulating the antenna and monitoring package together in a body where the antenna and monitoring package are spaced from each other;
   (d) providing an encapsulation mold having a plurality of walls;
   (e) placing the monitoring package and antenna in the encapsulation mold; and
   (f) adding encapsulation material to the encapsulation mold.

14. The method of claim 13, further comprising the step of connecting the antenna to one of the walls of the encapsulation mold before the encapsulation material is added to the encapsulation mold.

15. An electronic monitoring device for a pneumatic tire, the electronic monitoring device adapted to sense at least one engineering condition of the pneumatic tire and transmit data associated with the engineering condition outside of the pneumatic tire; the electronic monitoring device comprising:
   a body;
   a monitoring package carried by the body;
   a plate antenna carried by the body;
   the antenna having a length;
   the entire length of the antenna being spaced from the monitoring package;
   a connector connecting the antenna to the monitoring package;
   the body including an encapsulation material; and
   the body including an encapsulation mold.

16. The electronic monitoring device of claim 15, wherein the antenna is disposed adjacent the encapsulation mold.

17. An electronic monitor device for a pneumatic tire, the electronic monitoring device adapted to sense at least one engineering condition of the pneumatic tire and transmit data associated with the engineering condition outside of the pneumatic tire; the electronic monitoring device comprising:
   a body;
   a monitoring package carried by the body;
   an antenna carried by the body; the antenna being entirely disposed within the body; the antenna adapted to receive signals and to transmit signals from the tire;
   the antenna being spaced from the monitoring package;
   the body including an encapsulation material; and
   an encapsulation mold; the encapsulation mold being directly connected to the encapsulation material.

18. The electronic monitoring device of claim 17, wherein the encapsulation mold includes at least one sidewall and a bottom wall connected to the sidewall.

19. The electronic monitoring device of claim 18, wherein the antenna is disposed adjacent one of the bottom wall and sidewall of the encapsulation mold.

20. A tire tag for a pneumatic tire, the tire tag adapted to sense at least one engineering of the pneumatic tire; the tire tag comprising:
   a body;
   a monitoring package connected to the body;
   an antenna connected to the body;
   the antenna being spaced from the monitoring package;
   a power source connected to the body;
   the power source being spaced from the monitoring package;
   the body including an encapsulation material; and
   an encapsulation mold connected to the body; the monitoring package being spaced from the encapsulation mold.

21. The tag of claim 20, wherein the power source is spaced from the antenna.

22. The tag of claim 20, wherein the body has outer walls; the monitoring package being spaced from the outer walls of the body.

23. A tire tag for a pneumatic tire, the tire tag adapted to sense at least one engineering of the pneumatic tire; the tire tag comprising:
- a body including an encapsulation material;
- the body having outer surfaces;
- a monitoring package connected to the body;
- the monitoring package being spaced from the outer surfaces of the body;
- an antenna connected to the body;
- the antenna being spaced from the monitoring package; and
- an encapsulation mold connected to the body; the monitoring package being spaced from the encapsulation mold.

24. The tag of claim 23, wherein the body includes a lower surface adapted to be connected to the pneumatic tire; the antenna being disposed intermediate the lower surface and the monitoring package.

25. The tag of claim 24, further comprising a power source carried by the body; the power source being spaced from the monitoring package.

26. The tag of claim 25, wherein the antenna is a plate antenna.

27. A tire tag for a pneumatic tire, the tire tag adapted to sense at least one engineering of the pneumatic tire; the tire tag comprising:
- a body including an encapsulation material;
- the body including a lower surface adapted to be connected to the pneumatic tire;
- a monitoring package connected to the body;
- an antenna connected to the body;
- the antenna being spaced from the monitoring package;
- the antenna being disposed intermediate the lower surface of the body and the monitoring package; and
- an encapsulation mold connected to the body.

28. The tag of claim 27, wherein the encapsulation mold includes a bottom wall disposed at the lower surface of the body.

* * * * *